United States Patent

[11] 3,628,042

| [72] | Inventor | Charles J. Jacobus<br>c/o Charles Equipment Co. 17W601 North Ave., Villa Park, Ill. 60181 |
|---|---|---|
| [21] | Appl. No. | 839,037 |
| [22] | Filed | July 3, 1969 |
| [45] | Patented | Dec. 14, 1971<br>Continuation-in-part of application Ser. No. 801,644, Feb. 24, 1969, now Patent No. 3,558,901. This application July 3, 1969, Ser. No. 839,037 |

[54] CONTROL SYSTEM
2 Claims, 5 Drawing Figs.

[52] U.S. Cl. ................................................ 290/40, 60/52
[51] Int. Cl. ................................................ H02p 9/04
[50] Field of Search ........................................ 290/30, 30.4, 30.5, 40, 40.2, 4; 60/52 VS

[56] References Cited
UNITED STATES PATENTS

| 2,775,724 | 12/1956 | Clark | 290/40 X |
| 2,866,150 | 12/1958 | Lewis | 290/40 X |
| 2,977,765 | 4/1961 | Fillmore | 60/52 VS |
| 3,056,036 | 9/1962 | Gardner | 290/4 |
| 3,247,669 | 4/1966 | Hann | 60/52 VS |
| 3,302,487 | 2/1967 | Kempson | 60/52 VS |
| 3,359,727 | 12/1967 | Hann et al. | 60/52 VS |
| 3,438,201 | 4/1969 | Nash et al. | 60/52 VS |
| 3,477,013 | 11/1969 | Smith | 322/32 |
| 3,478,513 | 11/1969 | Ma et al. | 60/52 VS |

Primary Examiner—G. R. Simmons
Attorney—Hofgren, Wegner, Allen, Stellman & McCord ABSTRACT: A control system using a motive source and connected hydrostatic transmission to drive a load at a speed determined by the volume of fluid flowing in the transmission. A comparator and actuator change the volume of fluid flow in proportion to the deviation between a feedback signal and a control signal. The feedback signal is generated by a sensor responsive to the output of the transmission. The control signal has a value dependent upon the type of load connected to the transmission.

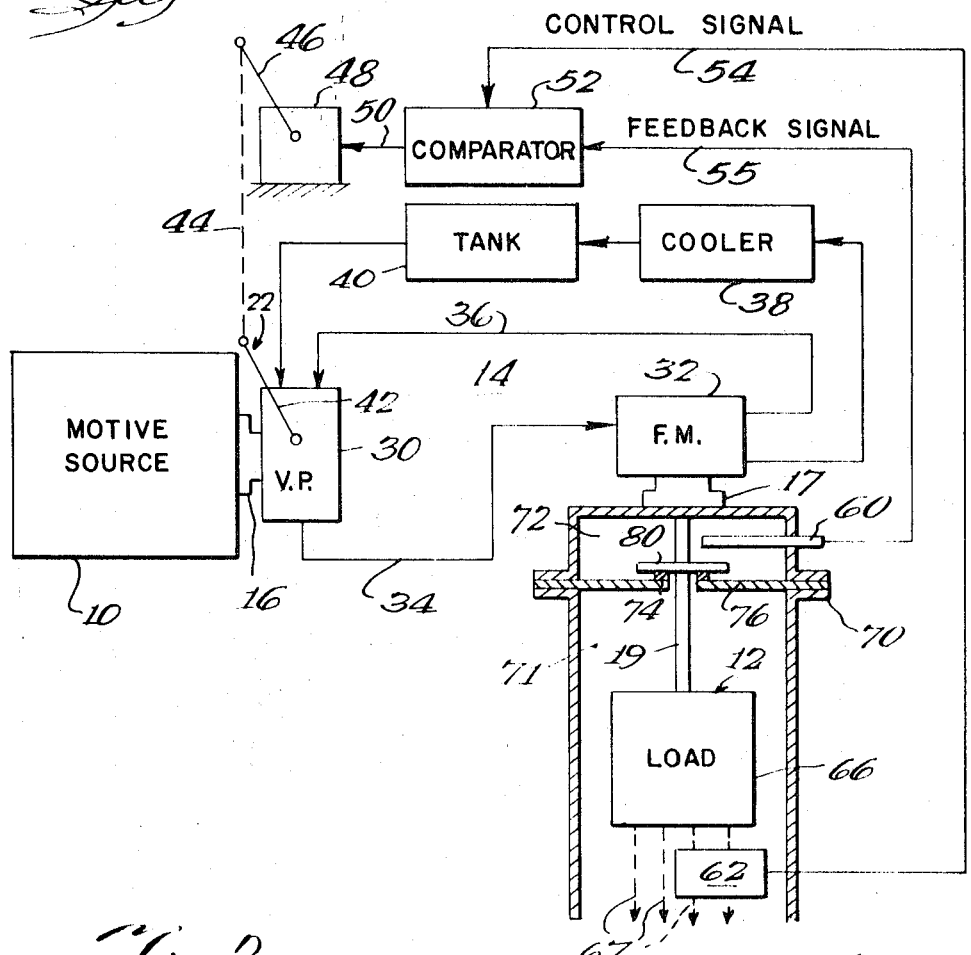

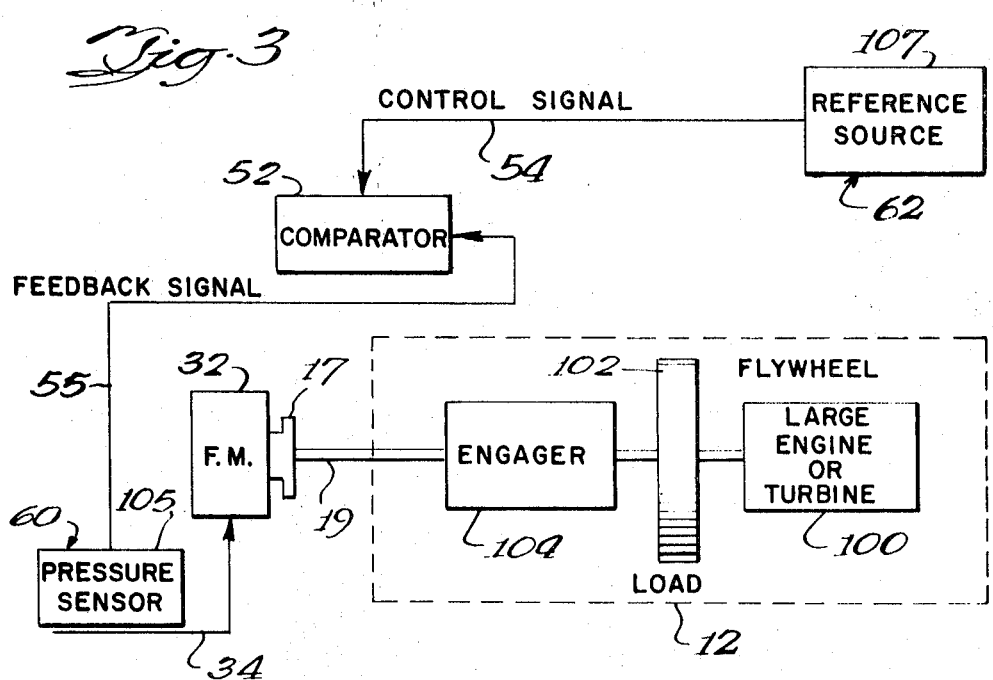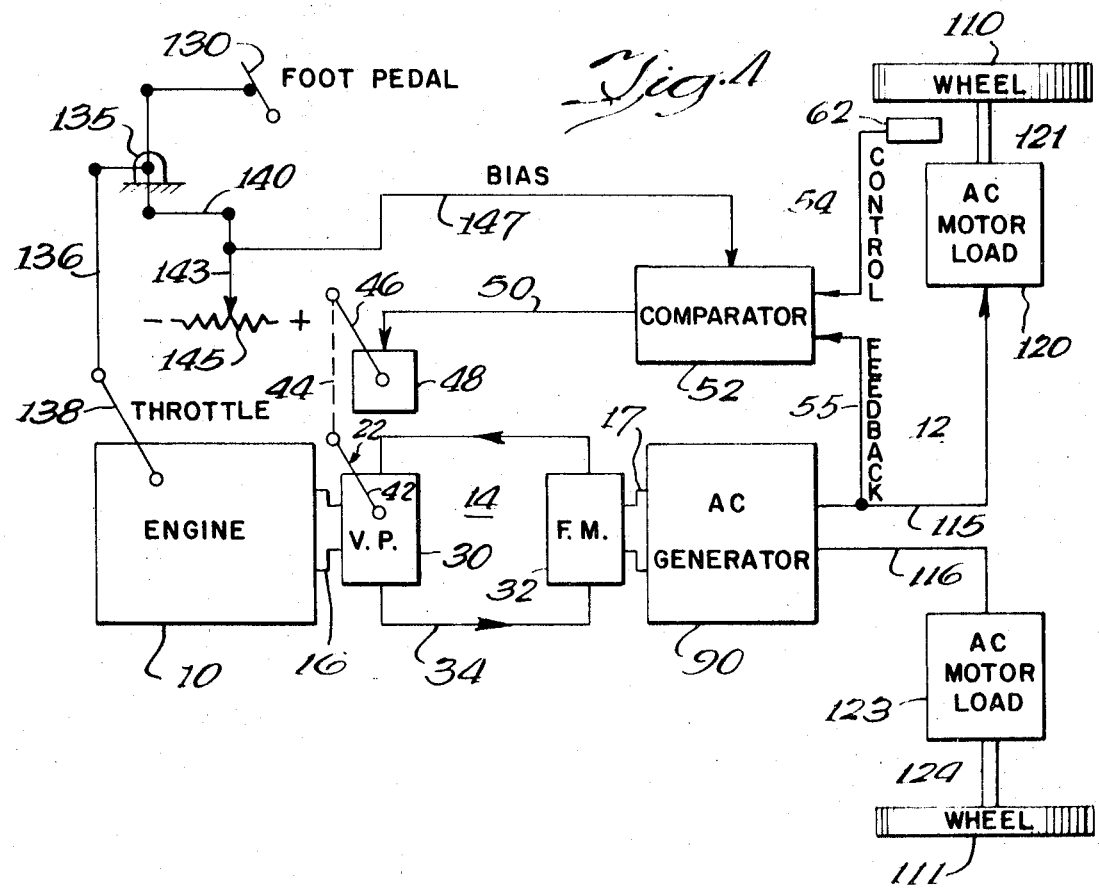

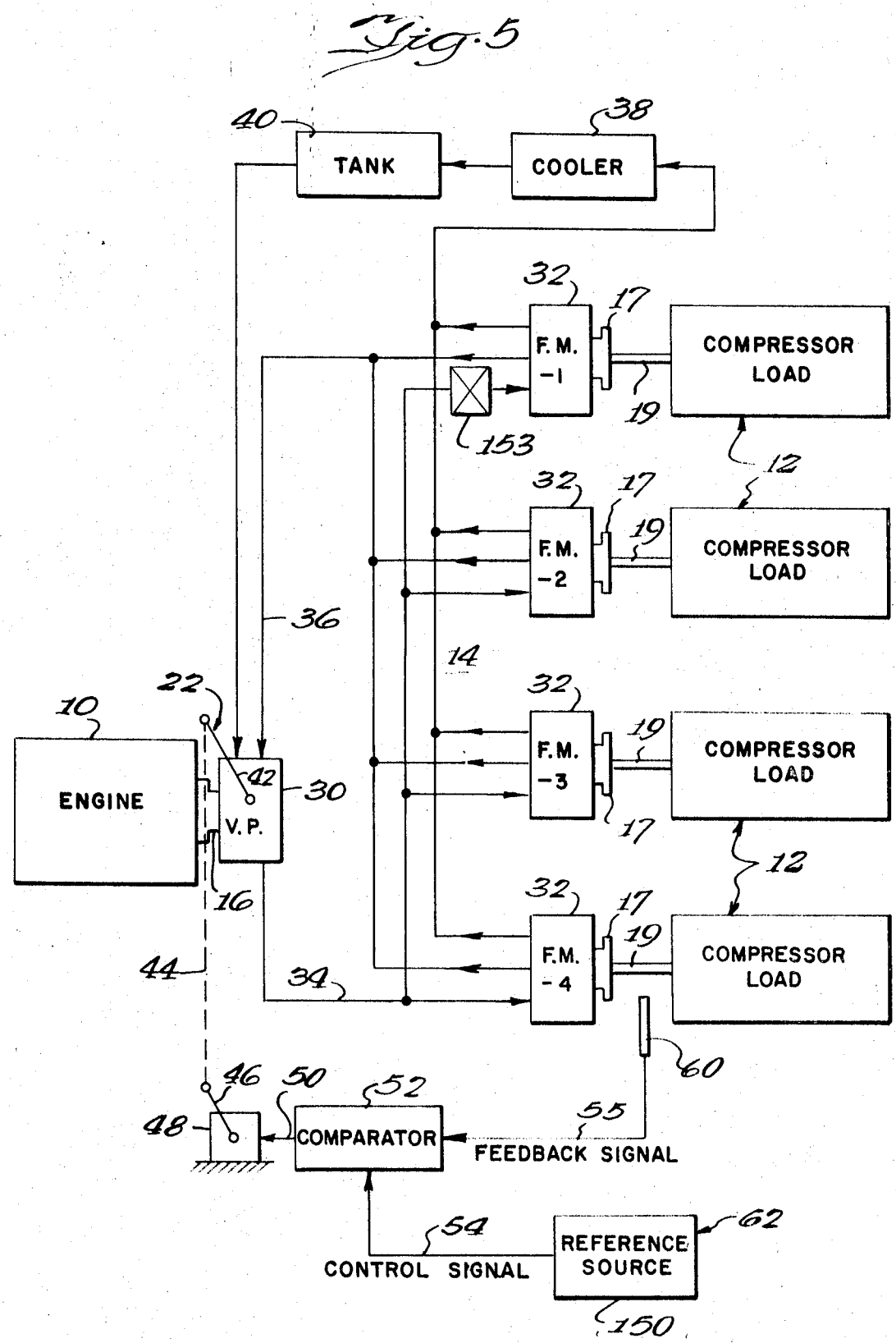

CONTROL SYSTEM

This application is a continuation-in-part of my copending application, Ser. No. 801,644, filed Feb. 24, 1969, now Pat. No. 3,558,901 and entitled "Stand-By Power System."

This invention relates to a control system for a load which produces an output dependent on the speed of rotation of an input shaft, and more particularly to a system of the above character in which the input shaft is driven by a hydrostatic transmission.

In my before identified copending application, a control system was disclosed for driving a load in the form of an AC generator. The motive source was either an AC motor, when external power was available, or a standby gas or diesel engine when external power failed. The coupling between the motive source and the AC generator load was a hydrostatic transmission. The present application encompasses the broader aspects of my invention, in that the loads are of a more generalized nature. Each load produces an output dependent on the input speed of rotation thereto from a hydrostatic transmission. Depending upon the type of output and the type of load, certain types of control signals are generated and compared with certain types of feedback signals to control the hydrostatic transmission.

For the particular loads disclosed in this application and my earlier application, various means other than the means used herein have been used for coupling a motive power source to the load, such as magnetic eddy current coupling. Such couplings have been employed due to a compatibility which adapted that coupling to the load, even though the coupling had a low efficiency of power transfer and was expensive. In accordance with the present invention, a control system is disclosed in which a hydrostatic transmission is adapted to drive various types of loads not heretofore driven by a hydrostatic transmission. As will be apparent, the use of a hydrostatic transmission in the specific environment disclosed herein obviates the problems of prior couplings, and further substantially reduces the cost of the total system.

One object of this invention is the provision of an improved control system characterized in the use of a hydrostatic transmission as a coupling element for driving certain types of loads.

One feature of this invention is the provision of a system for controlling a load which acts upon a fluid medium. The load is driven by a hydrostatic transmission controlled by a comparator which matches a feedback signal with a control signal. The feedback signal is proportional to the output speed of rotation of the hydrostatic transmission. The control signal is connected to a sensor placed in the path of the fluid medium in order to control the movement of the fluid medium in response to a sensed fluid characteristic.

Another feature of the invention is the provision of a control system for generating a variable frequency AC output. The output is generated by an AC generator driven by a hydrostatic transmission. For certain loads, the frequency output is continuously swept over a range of frequencies. In another embodiment, the load is an AC motor driving the wheels of a vehicle.

A further feature of the invention is the provision of a control system using a hydrostatic transmission with a variable displacement pump connected through tubing means to a fixed displacement motor. The volume of fluid flowing in the tubing means is sensed and is used as a feedback signal which is compared with a control signal.

A still further feature of the invention is the provision of a control system using a single variable displacement pump and a plurality of fixed displacement motors coupled thereto. When one of the motors is disconnected from the pump, the output of the remaining motors is maintained constant by a feedback control system.

Further features and advantages of the invention will be apparent from the following description, and from the drawings, in which:

FIG. 1 is a schematic diagram of a control system in which the load for a hydrostatic transmission is in the form of a means for moving a confined fluid medium;

FIG. 2 is a schematic diagram of a modification to FIG. 1, in which the load is replaced by an AC generator and connected electric loads;

FIG. 3 is a schematic diagram of another modification to FIG. 1, in which the load is replaced by an engine or turbine started by cranking torque from the hydrostatic transmission;

FIG. 4 is a schematic diagram of a control system in which the load for a hydrostatic transmission is in the form of an AC generator coupled to AC motors which drive the wheels of a vehicle; and FIG. 5 is a schematic diagram of a control system in which the hydrostatic transmission includes a plurality of fixed displacement motors, each driving a compressor load, with all motors being coupled to a single variable displacement pump connected in a feedback control system.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

Turning to the drawings, each embodiment of the invention includes a source 10 of rotating motive power, see for example FIG. 1, which power is ultimately transmitted to a load 12 by means of a hydrostatic transmission 14. The hydrostatic transmission 14 has an input coupling 16, coupled to and driven by motive source 10, and an output coupling 17 connected to an input shaft 19 of load 12. Adjustable means 22, forming a part of hydrostatic transmission 14, selects different speeds of rotation of output coupling 17 for a given speed of rotation of input coupling 16. By means of the feedback control system to be described hereafter, certain characteristics of the load 12 are controlled by causing corresponding actuation of adjustment means 22 which in turn controls the speed of rotation of output coupling 17 and shaft 19.

Hydrostatic transmission 14 includes a variable displacement piston pump 30 and a fixed displacement axial piston motor 32. High pressure oil flow output from pump 30 is coupled through tubing 34 to motor 32. Return flow is provided through a low pressure oil flow tubing 36 connected from motor 32 to pump 30. In addition, a part of the oil flow output from motor 32 is coupled through a cooler coil 38 to a reservoir tank 40 for supplying additional oil to pump 30. Adjustment means 22 controls the displacement or volume of oil flow through the pump 30. The adjustment means terminates in an arm 42 whose angular position is directly related to the volume of oil displaced by pump 30. Arm 42 is connected through mechanical linkage 44 to an arm 46 of an electric governor actuator 48 which converts an electrical signal on an input line 50 into a corresponding unique angular position for arm 46.

Different output characteristics of load 12 may be controlled by means of hydrostatic transmission 14 and the associated feedback control. The control includes a comparator 52 having an input line 54 and an input line 55, and an output which is coupled directly to line 50. Line 55 is coupled to a sensor 60 which generates a feedback signal varying in proportion to a characteristic which bears a direct relation to the speed of rotation of output coupling 17. For example, such a sensor in FIG. 1 consists of a speed indicating device for shaft 19, having a variable frequency output.

The other input to comparator 52, namely line 54, is coupled to a device 62 which generates a control signal. Desirably, the control signal varies in the same manner as the feedback signal. In FIG. 1, device 62 generates a frequency varying signal.

Comparator 52 itself is a conventional circuit for comparing a pair of input signals and producing an error signal output on line 50 proportional to the difference between the input signals. This output, in the form of a DC signal, has zero amplitude when the input signals are the same.

In operation, mechanical linkage 44 is initially adjusted so that load 12 has a desired output for a given value of control signal from device 62. As the output from load 12 deviates from this value, the error signal produced on line 50 causes corresponding rotation of arm 46 and hence arm 42 in order to vary the oil output of pump 30. The change in oil output is in such a direction as to cause motor 32 to change its speed of rotation and return the system to a null condition. The output from device 62 depends upon the type of load 12 being utilized in the system. The control system will now be described in detail for the specific loads disclosed herein.

In FIG. 1, load 12 consists of a pump 66 which moves a fluid medium along a path 67. Such a pump 66 may take the form of a water pump, a gas or air compressor, a blower or fan, or similar device. Pump 66 is contained within a housing 70 which has a fluid containing portion 71 and a portion 72 isolated therefrom. A bearing 74 is located on a wall 76 which separates the fluid containing portion 71 from the isolated portion 72. The pump 66 is located within portion 71, for pumping or circulating the fluid medium along path 67. Shaft 19 of pump 66 passes through bearing 74 and through isolated portion 72 to connect with output coupling 17 of motor 32. A gasket 80 abuts bearing 74 and serves to seal the shaft passageway between portions 71 and 72.

Device 62 consists of a fluid sensor located within portion 71 and in the path of fluid flow 67. Sensor 62 has a frequency output dependent upon the characteristic of the fluid medium which is being sensed. The sensed characteristic may be pressure, temperature, or fluid flow. This characteristic, for example, fluid flow, controls the frequency of an AC control signal on line 54.

Sensor 60 is a speed sensing device for producing an AC feedback signal on line 55 which varies in frequency with changes in the speed of rotation of shaft 19. Sensor 60, which may be a magnetic pickup, is located within isolated portion 72 of housing 70, and adjacent a serrated portion of shaft 19. A conventional magnetic means (not shown), located on or external to the shaft, causes the rotation of shaft 19 to produce an AC output from sensor 60.

Comparator 52 is responsive to a difference in frequency between the control signal on line 54 and the feedback signal on line 55 to generate error signal 50, thereby causing the volume of oil flowing in tubing 54 to change a corresponding amount. While device 62 is disclosed as being a sensor located in the fluid medium path 67, it will be apparent that the device may be a separate control external to housing 70, and which is adjusted to select a desired fluid medium flow.

In FIG. 2, a different type of load 12 has been substituted for the pump 66 of FIG. 1, with corresponding changes in the control system. Herein, load 12 generates an electric output having a characteristic, such as frequency, dependent on the speed of rotation of output coupling 17. More particularly, an AC generator 90 is driven by shaft 19, to generate an AC output on a conductor 92 coupled to an electric load 94. Line 55 is directly coupled to conductor 92, in order that the feedback signal is the AC output from AC generator 90. Device 62 is in the form of a frequency selector 96. The output of selector 96 is a control signal on line 54 having a frequency equal to the desired frequency which is to be generated by AC generator 90.

Different characteristics of the electrical output from AC generator 90 may be controlled by means of the hydrostatic transmission and associated components. Illustratively, the controlled characteristic is frequency, which in turn is directly proportional to the speed of rotation of generator shaft 19. However, other characteristics such as voltage could be controlled by the system.

The electric load 94 may take various forms. For example, it may form the input of a sonar or radar apparatus, in which a band of frequencies are to be continuously swept. In such an application, frequency selector 96 is in the form of a sweep generator. Other types of electric loads include a conveyor takeup control, and an AC motor (as explained with reference to FIG. 4).

In FIG. 3, the load 12 of FIG. 1 has been replaced by a large engine or turbine 100. In this application, the control system is adapted to start the large turbine using the smaller starting motive source 10, FIG. 1. More particularly, the turbine 100 is connected to a fly wheel 102 and to an engager 104, which when engaged connects both the fly wheel 102 and turbine 100 to shaft 19 for the purpose of providing cranking torque to start the turbine 100. The engager 104 may be any conventional unit used for this purpose.

The control system is modified in that sensor 60 takes the form of a pressure sensor 105 associated with the high pressure oil tubing 34 for motor 32. Pressure sensor 105 may, for example, be located within tubing 34 so that the oil to motor 32 must pass the sensor. The output of sensor 105 is a signal on line 55 which has, for example, a voltage amplitude directly proportional to pressure in tubing 34. Device 62 is in the form of a reference source 107 having a fixed output which corresponds to the desired pressure to be maintained in tubing 34. For example, source 107 may have a fixed voltage of a magnitude which equals the magnitude of the feedback signal on line 55 when the pressure in tubing 34 is of the desired value.

In operation, the above system maintains the oil pressure to motor 32 at a constant, hence maintaining the torque to shaft 19 at a constant value. When turbine 100 is to be started, engager 104 connects shaft 19 via fly wheel 102 to turbine 100 and provides turbine 100 with a constant cranking torque. Once the turbine has been started, engager 104 is deactuated, disconnecting the system from the turbine.

In FIG. 4, the system is used to control a vehicle which is propelled or driven by wheels 110 and 111. The system is especially adapted for large vehicles, such as off-road graders and the like. Similar to FIG. 2, the hydrostatic transmission is used to drive an AC generator 90, herein having an AC output on a pair of lines 115 and 116. Line 115 is coupled to an electric load in the form of an AC motor 120, which has an output shaft 121 coupled to wheel 110. Similarly, line 116 is coupled to another AC motor 123 having an output shaft 124 coupled to wheel 111. The AC motors 120 and 123 are synchronous, and run at a speed determined by the frequency on lines 115 and 116. The control system is used to control the frequency of AC output from generator 90, thereby controlling the speed of rotation of wheels 110 and 111.

Generally, vehicles of the above described type desirably have a constant maximum horsepower output from the motive source 10 or engine. The top speed of the vehicle is limited by vehicle and resistance friction, and maximum drawbar pull is limited by wheel slip or traction. In accordance with the present invention, AC traction motors 120 and 123 are of the induction or synchronous type. The vehicle is started by using a low frequency signal at rated current and voltage, to thereby give an approximation of the optimum speed versus drawbar pull characteristic of the vehicle.

The control system for the vehicle includes a dual functioning comparator 52. To limit wheel slip, input line 54 is connected to a sensor 62 which has a frequency output directly proportional to the speed of rotation of wheel 110 and shaft 121. Such a sensor 62 may be similar to sensor 60 described with reference to FIG. 1. The input line 55 is directly coupled to line 115, so as to couple the AC output to the comparator 52. Similar to FIG. 2, comparator 52 makes a frequency comparison and is responsive to a difference in frequency to generate an error signal on line 50 which adjusts the volume of oil flow in the hydrostatic transmission 14. This changes the frequency output from generator 90 until it matches the control signal frequency on line 54. With this arrangement, wheel slip is corrected and produces less than a 3 percent maximum variance between the speed of rotation of the wheels and the selected speed of rotation from engine 10.

Comparator 52 also scales the error signal on line 50 in accordance with the selected speed of rotation of engine 10 as indicated by a foot or hand throttle control. A foot pedal 130, which alternately can be a hand lever, is connected to a bell crank 135 which has a linkage 136 connected to a throttle 138 for engine 10. The mechanical linkage operates in a conventional manner to adjust throttle 138 in accordance with the position of pedal 130, thus varying the output of engine 10. As will be apparent, outputs of increased speed cause a corresponding increase in the frequency of the AC signal generated by generator 90, thus increasing the speed of rotation of the AC motor loads 120 and 123.

In addition, the throttle linkage for the vehicle controls the bias or scaling of comparator 52. Bell crank 135 has an extending portion which moves an arm 140 in order to move the wiper 143 of a potentiometer resistance 145. Resistance 145 is connected across a DC voltage source. Thus, the voltage or bias on wiper 143 is proportional to the position of pedal 130. A line 147 is connected from wiper 143 to a bias input for comparator 152. Comparators with a bias input are well known, and will only briefly be described herein. As the bias increases in magnitude, the error signal on line 50 is also increased in magnitude, thereby scaling the error signal in accordance with the bias voltage. Such an arrangement is especially useful in controlling a vehicle of the above described type. As the speed of engine 10 is controlled by movement of the throttle, the frequency output of generator 90 is similarly controlled at an optimum rate which is limited by a maximum electrical slip.

In FIG. 5, the control system has been adapted to drive a plurality of separate loads 12, herein in the form of four separate air-conditioning compressors used in a single chiller unit. Four separate fixed displacement motors 32 drive the four compressors. Each motor 32 receives one-fourth of the volume of oil from the single variable displacement pump 30. The four fixed motors 32 have been designated FM-1 through FM-4.

The control system is connected similar to that described for FIG. 1. Sensor 60 in FIG. 5 may be the same as sensor 60 in FIG. 1, and device 62 may be the same or different than the device 62 in FIG. 1, but having the same type of output. For exemplary purposes, device 62 is illustrated as a reference source 150 having a fixed frequency output which forms the control signal on line 54. With this arrangement, control system will cause the speed of rotation of shafts 19 to maintain a fixed value, thus driving the compressors at a desired constant speed. Of course, if different speeds are desired, the frequency output from source 150 can be made variable.

In order to match the compressor output with the load requirements of the chiller unit, at least one of the motors 32, herein unit FM-1, has an electric solenoid valve 153 connected between the high pressure input to the motor 32 and the high pressure oil tubing 34. Valve 153 is normally open, allowing oil to pass to motor FM-1. When it is desired to reduce the total compressor output, as when a reduced load is sensed by a conventional air-conditioner control (not illustrated), solenoid valve 153 is closed, disconnecting motor FM-1 from the oil flow and hence stopping rotation of shaft 19 and hence stopping the compressor load connected thereto.

At this time, the other compressors will tend to increase in speed, because each is receiving additional oil from pump 30. The control system senses the increase in speed of shaft 19 and causes a corresponding decrease in the volume of oil flow from pump 30. Thus the speed of all connected compressors remains constant.

While only a single valve 153 has been illustrated, it will be apparent that valves may be provided for other of the motors 32, in order to control additional of the compressors. The above described system has the advantage of automatically compensating for variations in compressor speed, whether caused by external disturbances, or by disconnection of one or more of the plurality of compressors which are used on a single chiller unit.

I claim:

1. In a system for supplying an electric load with AC power of variable frequency and having an AC generator providing an AC output to said electric load with a frequency dependent upon the speed of rotation of an input shaft, a control for providing a selectable variable frequency output to said electric load, comprising:

a source of rotating motive power;

hydrostatic transmission means having an input coupling connected to said motive source, an output coupling connected to said input shaft of said AC generator, variable displacement pump means driven by said input coupling, fixed displacement motor means connected to said output coupling, means including a source of fluid and tubing means for interconnecting said source of fluid to said pump means and said motor means, and adjustment means for selecting different displacements of fluid by said pump means to vary the amount of fluid transmitted through said tubing means to said fixed displacement motor means in order to select different speeds of rotation of said output coupling for a given speed of rotation of said input coupling;

feedback means coupled to the AC output of said AC generator for generating an AC feedback signal varying in frequency in proportion to the frequency of said AC output to said electric load;

frequency load selector means for generating a control signal having a selectable frequency which can be varied;

comparator means having a first input coupled to said feedback means and a second input coupled to said frequency load selector means for comparing the frequency of said AC feedback signal with the frequency of said control signal and producing a command in proportion to the frequency deviation between said signals; and actuator means responsive to said command for varying said adjustment means until said input shaft has a speed of rotation which produces an AC output to said electric load having a frequency which corresponds to the selected frequency;

said frequency load selector means comprises a sweep generator for continuously sweeping a band of frequencies.

2. The control of claim 1 wherein said source of rotating motive power comprises a powered motor cable of producing a sustained torque to continuously drive said input coupling.

* * * * *